(12) United States Patent
Heiges

(10) Patent No.: US 6,722,077 B2
(45) Date of Patent: Apr. 20, 2004

(54) WATER FOWL DECOY

(76) Inventor: Charles W. Heiges, 50 Ewerson Rd., Port Clinton, OH (US) 43452

( * ) Notice: Subject to any disclaimer, the term of this patent is extended or adjusted under 35 U.S.C. 154(b) by 0 days.

(21) Appl. No.: 10/340,409

(22) Filed: Jan. 10, 2003

(65) Prior Publication Data

US 2003/0126784 A1 Jul. 10, 2003

Related U.S. Application Data

(60) Provisional application No. 60/347,474, filed on Jan. 10, 2002.

(51) Int. Cl.[7] ............................................. A01M 31/06
(52) U.S. Cl. ................................................. 43/3
(58) Field of Search .......................... 43/3, 2; 446/363, 446/322

(56) References Cited

U.S. PATENT DOCUMENTS

| | | | | |
|---|---|---|---|---|
| 74,458 A | * | 2/1868 | Wales ............................... | 43/3 |
| 3,736,688 A | * | 6/1973 | Caccamo ......................... | 43/3 |
| 3,869,823 A | * | 3/1975 | Powers et al. ................... | 43/3 |
| 5,003,722 A | * | 4/1991 | Berkley et al. ................. | 43/3 |
| 5,335,438 A | * | 8/1994 | Terrill ............................. | 43/1 |
| 5,572,823 A | * | 11/1996 | Savaria ............................ | 43/2 |
| 5,682,702 A | * | 11/1997 | McKnight et al. .............. | 43/3 |
| 2003/0079397 A1 | * | 5/2003 | Brint ............................... | 43/2 |

* cited by examiner

Primary Examiner—Charles T. Jordan
Assistant Examiner—Jordan Lofdahl
(74) Attorney, Agent, or Firm—Marshall & Melhorn, LLC.

(57) ABSTRACT

A hand held game fowl decoy comprising a generally flat body having opposed substantially parallel surfaces of contrasting color or brightness. The body includes a first rigid portion and a second rigid portion having a peripheral outline generally to provide roughly a silhouette of a game fowl's wing. The body is hinged along a hinge line which forms the junction between the first and second body portions. A handle adapted to be held in the hand of a hunter extends from the first body portion. Repeated movement of the handle by the hunter effects swinging of the second body portion relative to the first portion about the hinge line alternately making visible to the game fowl being hunted the contrasting color or brightness of at least the second body portion and simulating the flapping of a fowl's wings.

5 Claims, 3 Drawing Sheets

WATER FOWL DECOY

CROSS REFERENCE TO RELATED APPLICATION

This application is claiming the benefit, under 35 U.S.C. 119(e), of the provisional application filed on Jan. 10, 2002, under 35 U.S.C. 111(b), which was granted Serial No. 60/347,474. The provisional application No. 60/347,474 is hereby incorporated by reference. The provisional application No. 60/347,474 is co-pending as of the filing date of the present application.

BACKGROUND OF INVENTION

1. Field of the Invention

The present invention relates generally to decoys for water fowl hunting and, more particularly, to a hand held decoy for ducks or geese, or any game fowl or animal that would be attracted to a flashing that effectively simulates the flapping of a bird's wings

2. Discussion of the Related Art

Water fowl decoys which are made to resemble various water fowl such as ducks or geese have long been used by hunters to attract game to a particular area. Such decoys are generally made of wood or molded plastic and are placed in water to mimic the appearance of a flock of ducks or geese sitting in a lake or lagoon. Since the decoys are essentially motionless, such decoys are not particularly visible from the altitudes at which water fowl fly and therefore have limited success in attracting game.

Accordingly, a number of attempts have been made to introduce motion to water fowl decoys. Some conventional decoys are dragged by underwater systems to give the decoys the appearance of swimming about in the water. However, such conventional decoy systems produce only moderate performance, apparently since the swimming motion is hardly perceptible to water fowl flying overhead at significant altitudes. Other conventional decoys employ elaborate mechanically driven wings to imitate the flapping of wings by a bird. Such flapping decoys are better at attracting game but suffer from the disadvantages of mechanical complexity and associated expense.

What is needed is a particularly simple and inexpensive mechanism by which motion resembling the flapping of a bird's wings is introduced to a bird decoy.

SUMMARY OF THE INVENTION

In accordance with this invention, the appearance of movement such as the flapping of a bird's, eg. duck's, wings is provided by a hand held silhouette or molded resemblance decoy, including a body having opposed surfaces of contrasting color or brightness, ie. a dark side and a light side. The body comprises a first portion and a second portion having a peripheral outline to provide a silhouette roughly of a game fowl's wing. The body is hinged along a hinge line which forms the junction between the first and second body portions. A handle extends from the first body portion such that repeated movement of the handle through the hand of a hunter effects swinging of the second body portion relative to the first portion about the hinge line, alternately making visible to the game fowl being hunted the contrasting color or brightness of the opposed surfaces of at least the second body portion, and simulating the flapping of a fowl's wings. Accordingly, the present invention represents a significant reduction in the complexity and expense of prior art decoys with flapping wing mechanisms. In addition, the motion decoy accordingly to the invention is as effective, or more effective, in attracting game from the air, providing light and dark colors or a flashing semblance and a motion appearing to an aloft bird as, for example, a floating duck about to take flight or an inflight bird preparing to land, or any bird flying in that given area.

It has been found to be advantageous if the decoy body, to provide the desired silhouette, is substantially flat and in the shape generally of a block "L", and hinged at the junction of the legs of the "L". In this manner, when one portion or leg of the body, having a handle connected to the free end thereof, is held in the hunter's hand and rotated about its long longitudinal axis, the other leg pivots about the hinge and supplies the desired simulation.

BRIEF DESCRIPTION OF THE DRAWINGS

In the accompanying drawings, wherein like numerals refer to like parts throughout.

DETAILED DESCRIPTION OF THE PREFERRED EMBODIMENTS

Figure 1:
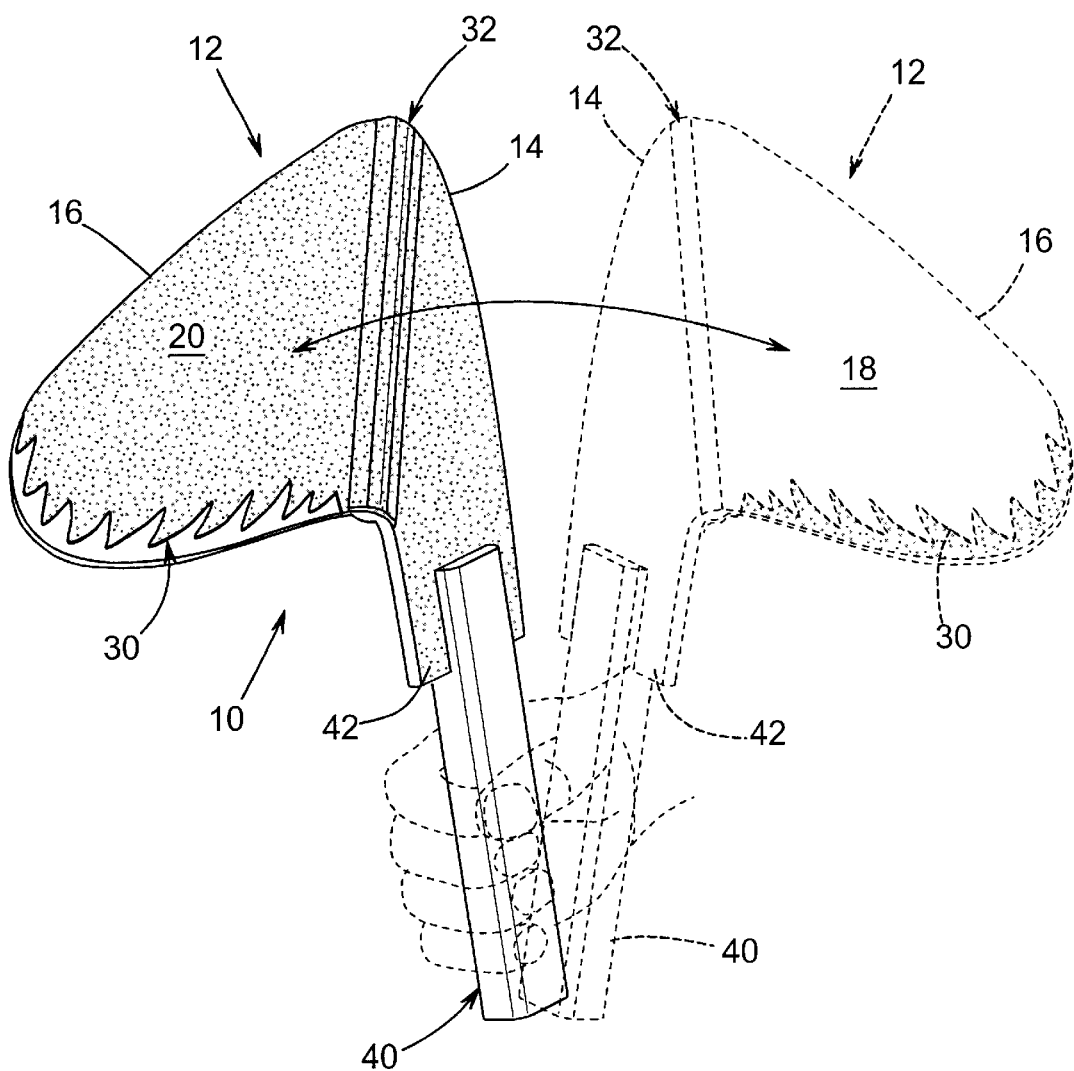
FIG. 1 is a perspective view of a decoy in accordance with the invention, illustrating in dotted line the back side thereof relative to the front side shown in full line, as for example when the decoy is rotated along the longitudinal axis of its handle by the hunter.

The decoy 10 of the invention preferably includes a generally flat, two dimensional or planar body 12 in the shape roughly of a block "L", including two leg components 14 and 16 joined together via a hinge connection, eg. of the double acting type, to present a silhouette of a portion of a duck's torso and attached wing, respectively. The hinge line generally intersects the angle between the legs. The opposed front and back sides 18 and 20, respectfully, of each of the legs are of two distinct colors, one light, eg. white, and one dark, eg. black (illustrated by speckling in FIGS. 1, 2 & 4) as will be described more fully hereinafter.

The body 12 of the decoy including both legs is composed of a stiff, substantially inflexible material such as fiberboard, wood, impregnated cardboard, plastic, or the like. The body on both sides 18 and 20 is, according to a preferred embodiment, covered with a layer of course fabric material 26, preferably of burlap or burlap-like fabric, adhered to the body with a suitable adhesive so as to present a textural, matte finish. A preferred form of adhesive is an acrylic latex adhesive of the type including a latex base. The fabric may be coated with a paint layer 28, the paint layer being of a dark color on the side 20 and light color on the side 18. The paint may include a feather design as shown at 30 to more closely resemble a wing.

While the use of a fabric such as burlap with an applied paint layer is a preferred covering, many other materials and composites may be employed and be effective. For example, a durable, weatherproof corrugated synthetic plastic film, eg. of vinyl or polyethylene terephthalate may be used, as well as photographically printed plastic or canvas layers. It is necessary in all instances, however, that the coverings on opposed surfaces be of contrasting color and/or brightness so as to provide, when alternately presented to the view of the game fowl, a distinctly different appearance.

Figure 2:
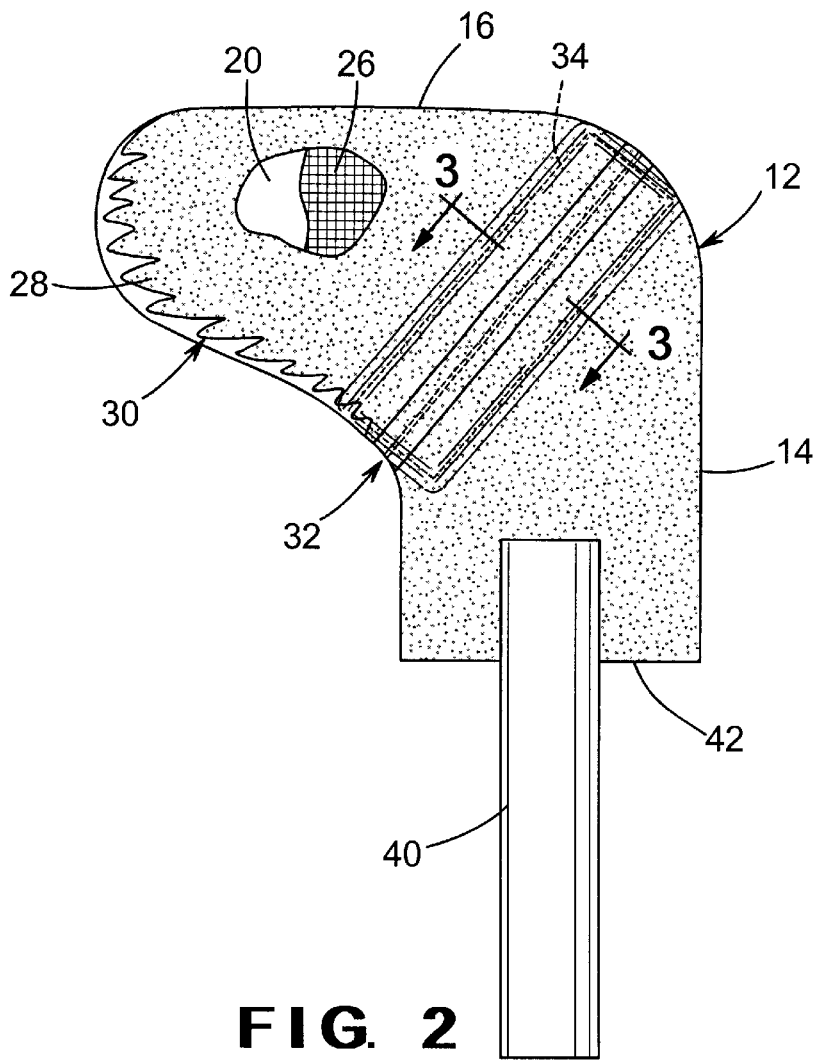
FIG. 2 is an elevational view of the back side of the decoy (the dark side) with a portion of an exposed color, eg. paint, coating broken away to show a fabric covering underneath.
Figure 3:
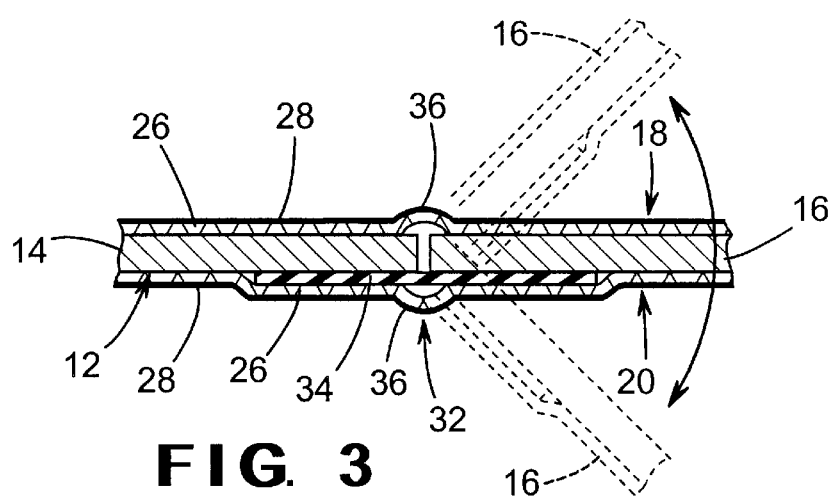
FIG. 3 is an enlarged detailed sectional view taken along the line 3—3 of FIG. 2.

In the embodiment of the invention shown in FIGS. 1, 2 and 3, the hinge, indicated generally at 32, is provided by a strip 34 of a pliant, elastic material such as rubber, neoprene or the like adhered to each of the spaced, aligned leg surfaces forming the dark side 20 of the body of the decoy. The strip 34 is also covered by the coated fabric 26 and adhered thereto, with a slight excess of fabric shown at 36 provided over the space between the legs on both sides 18 and 20 to enable the desired rotation of the leg 16 about the hinge relative to the leg 14 without restricting same. In this respect, it has been found that this configuration of the fabric is helpful in supplementing or strengthening the desired rotational hinge action principally provided through the strip 34. In this same regard, it would also be possible to include an additional rubber or neoprene strip adhered to the spaced, aligned leg surfaces forming the light side 18 of the decoy body opposite the strip 34 to provide a still stronger hinge.

A handle or grip 40 is affixed to and extends from the free end 42 of the leg component 14 and includes a slot (not shown) into which the leg 16 is received and adhered thereto through a suitable adhesive, screw, or the like.

Figure 4:
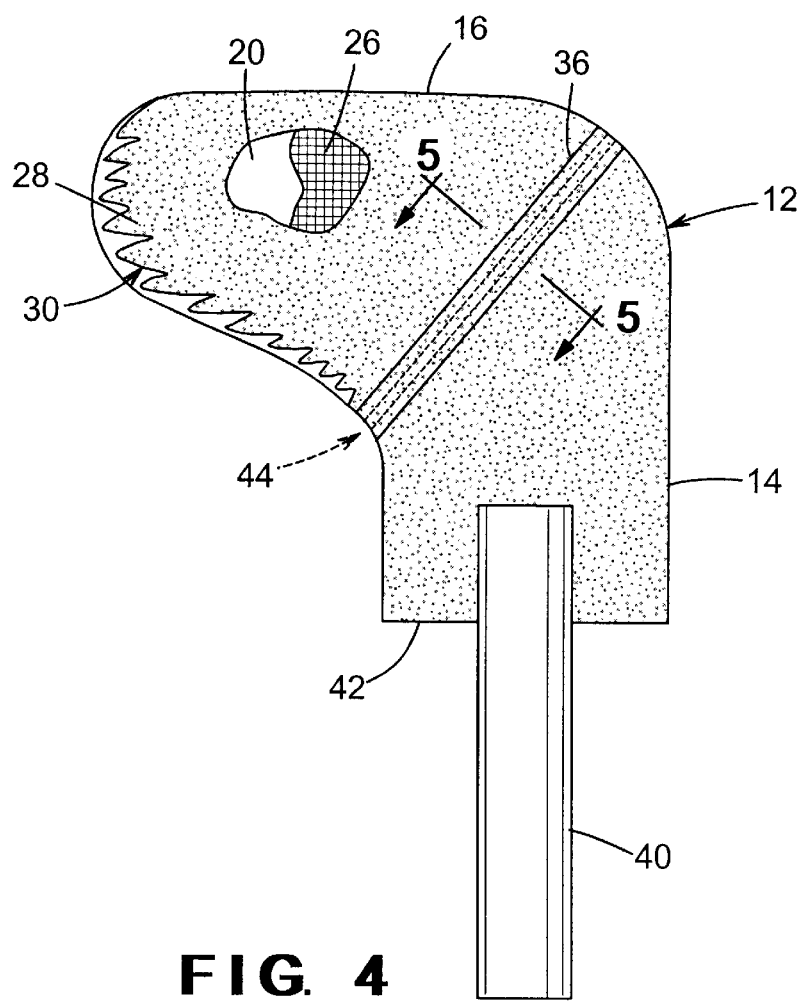
FIG. 4 is an elevational view of the back side of a decoy in accordance with a second embodiment of the invention.
Figure 5:
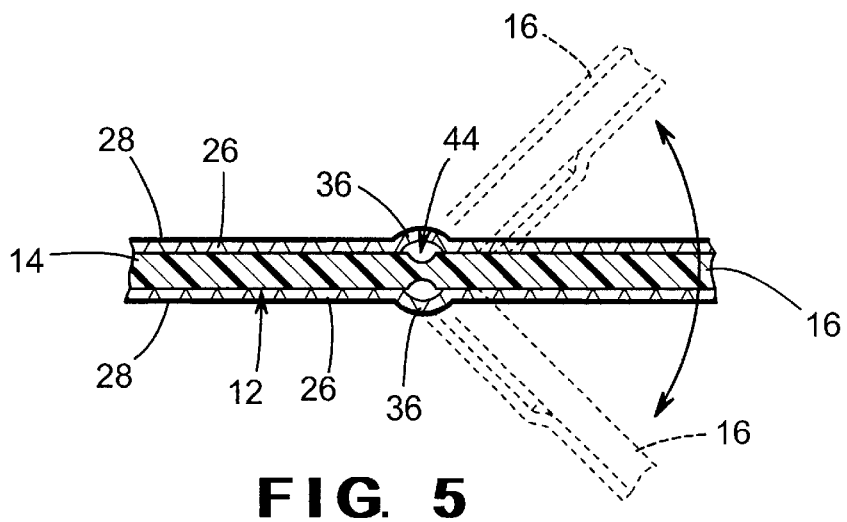
FIG. 5 is an enlarged detailed sectional view taken along the line 5—5 of FIG. 4.

A second embodiment of the invention is illustrated in FIGS. 4 and 5. In accordance with this embodiment, the body 12 is of one-piece construction and composed of a plastic such as polypropylene or high density polyethylene. The plastic body includes a thin section dividing the legs to provide a living hinge as illustrated at 44.

From the above description, the novel motion of the hand held decoy of the invention is believed to be readily apparent. Thus, when the decoy is held in the hand of a hunter and subjected to repeated, alternating clockwise and counter-clockwise movement, the leg 14 will rotate or pivot about the hinge as shown in dotted lines in FIGS. 3 and 5. At the same time, rotation of the body 12 as a whole takes place through rotation of the handle 40 by the hunter. A unique compound motion is thereby obtained which very effectively simulates the flapping of a duck's wings.

There is another advantage of the hand held flapper decoy of the present invention when compared for example to motorized wings on a floating decoy, in addition to expense. Thus, once a hunter gets the attention of the birds and they are coming at him, the hunter puts the flapper decoy down. In this way, the birds that get away will not associate the flapper with being shot at and therefore will not flare from it the next time, like those birds that flare from the motorized wings left out on the floating or standing decoys.

Those skilled in the art will appreciate that the invention may be embodied in other specific forms than illustrated without departing from the spirit or essential characteristics thereof. The present embodiments are therefore to be considered in all respects illustrative and not restrictive.

What is claimed:

1. A game fowl decoy adapted to be held in the hand of a hunter; comprising a body having opposed surfaces of contrasting color or brightness, said body including a first portion and a second portion joined together through a hinge means, said second portion having a peripheral outline to provide a silhouette roughly of a game fowl's wing; and a handle extending from said first portion of said body, whereby repeated movement of said handle through the hand of a hunter effects swinging of said second body portion relative to the first portion about said hinge means alternately making visible to the hunted game fowl the contrasting color or brightness of the opposed surfaces of the second body portion and simulating the flapping of a fowl's wings.

2. A game fowl decoy as claimed in claim 1, wherein one opposed body surface is black and the other white.

3. A game fowl decoy adapted to be held in the hand of a hunter; comprising a generally L-shaped body portion having opposed substantially flat parallel surfaces and defined by first and second angled leg components which together provide a rough silhouette of a game fowl's torso and an associated wing, respectively, said body portion being hinged along a line intersecting the angle between the legs, each of said opposed surfaces of said body portion being provided with a fabric covering of contrasting color or brightness; and a handle portion affixed to and extending from the free end of said first leg component and having a longitudinal axis in the direction of its extension, whereby rotation of said handle about its longitudinal axis effects corresponding rotation of said first leg component which in turn causes pivoting of said second leg component about said hinge line relative to said first leg component simulating flapping of a fowl's wings.

4. A game fowl decoy as claimed in claim 2, wherein said fabric covering is burlap and includes a black paint coating on one opposed surface and a white paint coating on the other surface.

5. A game fowl decoy adapted to be held in the hand of a hunter; comprising a generally L-shaped body portion of one piece of synthetic plastic having opposed generally parallel surfaces and defined by first and second leg components joined together to provide roughly a silhouette of a game fowl's torso and an associated wing, respectively, said leg components being joined through an area of reduced plastic thickness to provide a living hinge there between, each of said opposed surfaces of said body portion being of contrasting color or brightness with regard to the other, and a handle portion affixed to an extending from the free end of said first leg component and having a longitudinal axis in the direction of its extension, whereby rotation of said handle about its longitudinal axis effects corresponding rotation of said first leg component which in turn causes pivoting of said second leg component about said living hinge relative to said first leg component simulating flapping of a fowl's wings.

* * * * *